(12) United States Patent
Sinn et al.

(10) Patent No.: US 10,826,876 B1
(45) Date of Patent: Nov. 3, 2020

(54) OBSCURING NETWORK TRAFFIC CHARACTERISTICS

(71) Applicant: Amazon Technologies, Inc., Seattle, WA (US)

(72) Inventors: Frederick David Sinn, Seattle, WA (US); Colm Gearöid MacCárthaigh, Seattle, WA (US); Thomas Bradley Scholl, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 85 days.

(21) Appl. No.: 15/388,426

(22) Filed: Dec. 22, 2016

(51) Int. Cl.
  *H04L 29/06* (2006.01)
(52) U.S. Cl.
  CPC ........ *H04L 63/0428* (2013.01); *H04L 63/123* (2013.01)
(58) Field of Classification Search
  CPC .................... H04L 63/0428; H04L 63/123
  USPC ....................................................... 713/168
  See application file for complete search history.

(56) References Cited

U.S. PATENT DOCUMENTS

| | | | | |
|---|---|---|---|---|
| 6,327,660 B1* | 12/2001 | Patel | ...................... | G06F 21/575 380/277 |
| 7,032,111 B1* | 4/2006 | Ruutu | ...................... | H04L 29/06 380/29 |
| 2005/0135808 A1* | 6/2005 | Yun | ...................... | H04B 10/40 398/58 |
| 2010/0142915 A1* | 6/2010 | McDermott | .......... | G11B 27/034 386/343 |
| 2010/0226243 A1* | 9/2010 | Lee | ...................... | H04L 1/1819 370/216 |
| 2012/0218939 A1* | 8/2012 | Walke | .................. | H04L 63/0428 370/328 |
| 2014/0226820 A1* | 8/2014 | Chopra | ............... | H04L 63/0485 380/277 |
| 2015/0006586 A1* | 1/2015 | Mourad | .................. | H04H 20/95 707/793 |
| 2015/0117177 A1* | 4/2015 | Ganga | ................... | H04L 49/251 370/216 |
| 2015/0372902 A1* | 12/2015 | Giorgetti | ................. | H04L 45/64 370/219 |

(Continued)

OTHER PUBLICATIONS

"Configuring MACsec Encryption," *Catalyst 3750-X and 3560-X Switch Software Configuration Guide*, Chapter 1, available at: http://www.cisco.com/c/en/us/td/docs/switches/lan/catalyst3750x_3560x/software/release/15-0_1_se/configuration/guide/3750xcg/swmacsec.pdf (viewed on Nov. 8, 2016), 16pp.

(Continued)

*Primary Examiner* — Alexander Lagor
*Assistant Examiner* — Moeen Khan
(74) *Attorney, Agent, or Firm* — Klarquist Sparkman, LLP

(57) ABSTRACT

The following description is directed to encrypting the characteristics of network traffic. In one example, a method can include receiving an unencrypted link layer packet including a first payload of a first size. The method can include encrypting the first payload of the unencrypted link layer packet. The method can include generating an encrypted link layer packet including a second payload. The second payload can include the encrypted payload and a variable length padding field so that the second payload of the encrypted link layer packet is a different size than the first size of the first payload. The encrypted link layer packet can then be transmitted.

19 Claims, 10 Drawing Sheets

(56) References Cited

U.S. PATENT DOCUMENTS

| | | | |
|---|---|---|---|
| 2016/0149692 A1* | 5/2016 | Kim | H04L 12/4625 |
| | | | 370/503 |
| 2017/0104851 A1* | 4/2017 | Arangasamy | H04L 69/22 |
| 2018/0152429 A1* | 5/2018 | Segal | H04L 9/0861 |

OTHER PUBLICATIONS

MACsec Feature Guide: Supporting FastIron Software Release 8.0.30, *Brocade Communications Systems, Inc.*, Apr. 7, 2015, 14pp.

* cited by examiner

OBSCURING NETWORK TRAFFIC CHARACTERISTICS

BACKGROUND

Distributed computer systems communicating over a network can enable the transfer of information within an entity or between different entities. One or more of the entities may desire that the transferred information be kept private from observers that may have access to the network. As the complexity and ubiquity of distributed computer systems increases, however, maintaining information security can become more challenging even as users of the distributed computer systems place a higher value on the security of their information. Additionally, the sophistication of those seeking to gain unauthorized access to the information continues to grow. Thus, networking equipment vendors and providers of network services may desire to increase the security of information transiting a network so that they can keep their operations private and/or to maintain the trust and goodwill of their customers.

DETAILED DESCRIPTION

Overview

Figure 1:
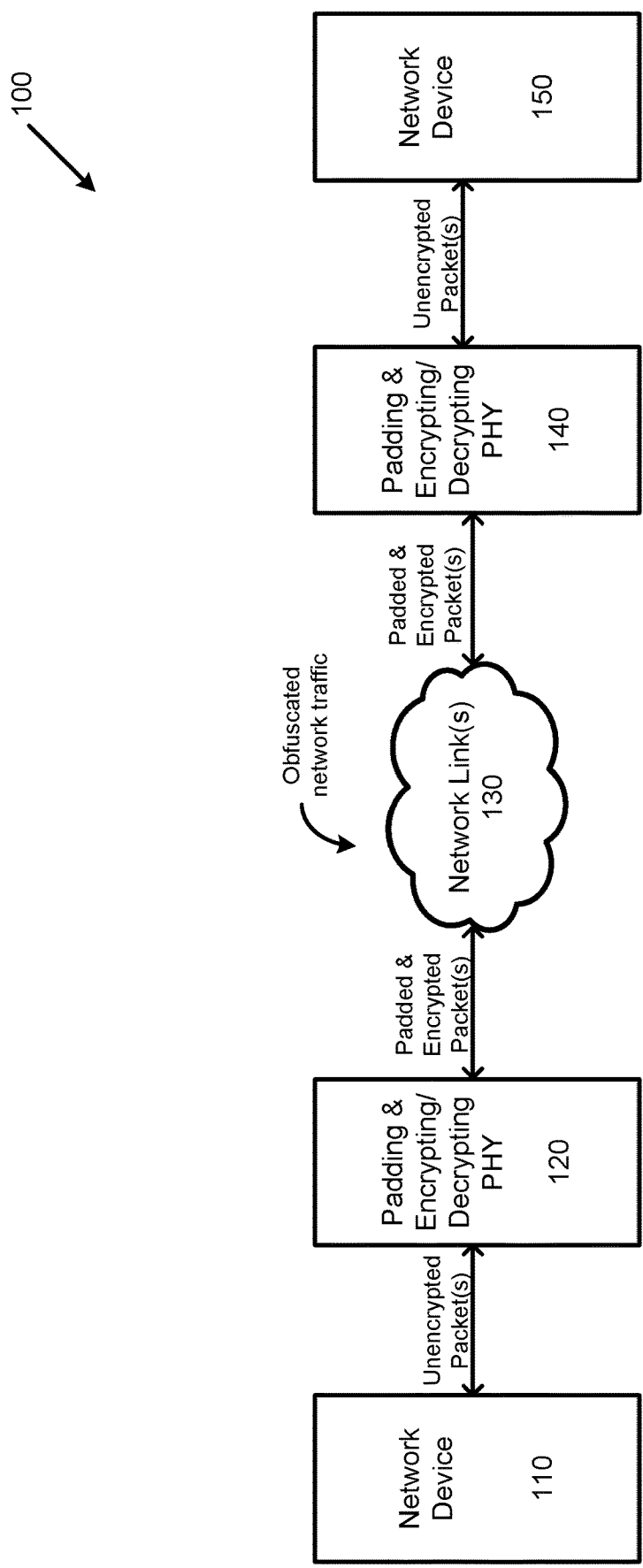
FIG. 1 is a system diagram showing an example of a system for encrypting the characteristics of network traffic transiting a network.

The information transmitted over a network can be safeguarded at a first level by using cryptographic techniques to encrypt the information stored within network packets. Encrypted information is encoded such that the information generally cannot be understood unless the encrypted information is first decrypted with a decryption key. As a specific example, packets can be transferred over Ethernet links using the IEEE 802.1AE Media Access Control Security (MACsec) protocol. In particular, the MACsec Key Agreement (MKA) Protocol can enable network devices to exchange keys used for encryption and/or decryption. Unencrypted packets can be encrypted and encapsulated within a MACsec packet, transmitted from one network device to another network device over a network link, and recovered by extracting the encapsulated encrypted packet and decrypting the encrypted packet.

Encryption is a method for potentially protecting confidential data. Encryption can include using a cryptographic algorithm to encode data such that the information in the data generally cannot be understood unless the encrypted data is first decrypted with a decryption key. For example, one or more keys can be used to encrypt the configuration data using a cryptographic algorithm. A "key" is a number that can vary in length depending on the cryptographic algorithm. Exemplary cryptographic algorithms can be symmetric or asymmetric. For a symmetric algorithm, the same key can be used for encryption and decryption of the data. In other words, a symmetric key can function as both an encryption key and a decryption key for the data. It is desirable to safeguard a symmetric key because anyone having access to the key can potentially decrypt data that has been encrypted using the key. Symmetric algorithms can be based on stream ciphers or block ciphers. Examples of symmetric cryptographic algorithms include Advanced Encryption Standard (AES), Data Encryption Standard (DES), triple-DES, Twofish, Serpent, Blowfish, and CAST-128. For an asymmetric algorithm, a public key can be used for encryption and a private key can be used for decryption of data. The public key and the private key form a key pair, where the public key and the private key are mathematically related. The public encryption key can be freely accessible since it can only be used to encrypt data, but it is desirable to safeguard the private decryption key since it can be used to potentially decrypt the data. Examples of asymmetric cryptographic algorithms can include the RSA algorithm or an algorithm based on elliptic curve cryptography.

Even when the individual packets are encrypted, characteristics of the network traffic may still potentially provide information to an observer of the network traffic. The characteristics of the network traffic can include the size of the network packets, the time between the network packets, the number of network packets, and patterns formed by a series of network packets. As one example, images and/or other data can have a known size. In particular, a set of images viewable over the Internet can be characterized. Each of the images can have a particular size. Thus, an observer can potentially determine if a particular image is being viewed by comparing the size of packets sent over the network to the size of the known images. Similarly, if a webpage has three images of a particular size, an observer can potentially determine if a particular webpage is being viewed by comparing a fingerprint (e.g., size and order) of packets sent over the network to a fingerprint of known webpages. As another example, digitized speech can follow a particular pattern. An observer can potentially determine all or a portion of a conversation by comparing a pattern (e.g., size, timing, relationships) of voice-over-IP packets to patterns of digital speech data for known words or phrases. As another example, an amount of network traffic can potentially provide business intelligence about a publicly- or privately-traded company. In particular, an amount and/or pattern of traffic at the company's website may be a rough indicator of sales for the company.

As described herein, the characteristics of network traffic can be encrypted or obscured. In particular, network traffic patterns can be obscured during transmission at the link level by adding padding to frames so that the size of the packets is hidden. The padding can be encrypted so that it appears as random bits to an outside observer. Additionally, quiet moments between frames can be filled with transmissions of false or filler frames filled with encrypted padding data. A receiver of the packets can drop the filler frames and strip out the padding within the actual frames. In this manner, a fingerprint of the network traffic can be potentially hidden from outside observers and a second level of protection can be provided for securing information transmitted over a network.

The Open Systems Interconnection (OSI) model standardizes and partitions the internal functions of a communication system into abstraction layers. In particular, the OSI model standardizes and partitions a communication system into seven layers. A particular layer provides a communication path with the layers adjacent (e.g., a layer above and a layer below) to the particular layer. The lowest layer is the physical layer (referred to as layer 1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (referred to as layer 2). The link layer defines the protocols for transferring data between two nodes. Additionally, the link layer can define protocols for establishing and terminating connections between nodes, managing flow control, and detecting and/or correcting errors occurring on the physical layer. Examples of link layer protocols are Ethernet, Asynchronous Transfer Mode (ATM), Point-to-Point Protocol (PPP), High-level Data Link Control (HDLC), Fiber Distributed Data Interface (FDDI), and Token Ring. The link layer can provide a communication path with the network layer (referred to as layer 3). Examples of network layer protocols are Internet Protocol (IP) (including IPv4 and IPv6), ICMP, Address Resolution Protocol (ARP), Internetwork Packet Exchange (IPX), and Datagram Delivery Protocol (DDP). Other layers of the OSI model include the transport layer (layer 4), the session layer (layer 5), the presentation layer (layer 6), and the application layer (layer 7). It should be noted that a network packet (or simply a packet) generally includes a header used to address the packet to a remote node or agent at the layer of the packet and a payload having a discrete quantity of information. A packet addressing an agent at one layer can be encapsulated within the payload of a packet at a lower layer as the higher layer packet transits the communication layers. A packet of the link layer can also be referred to as a frame. The OSI model is a reference and some networking protocols may not strictly adhere to the seven layers of the OSI model. For example, in some embodiments, the functions of the link layer and the physical layer may be blended into a single link layer. The combination of protocols used at the different layers of the OSI model can be referred to as a protocol stack. For example, one particular protocol stack may include an IP layer and an Ethernet layer.

The link layer can potentially be a good choice within a network architecture for obscuring the characteristics of network traffic. In particular, a transfer rate of the link layer is closely matched to the line rate of the underlying physical layer and generally, a relatively small amount of processing is performed between the link layer and the physical layer compared to the processing at higher levels of the OSI model. Additionally, a physical transceiver device (PHY) for translating between the link layer and the physical layer may have a relatively complete view of the traffic to be transmitted over a communications link. In contrast, software and/or hardware agents operating at a higher layer of the OSI model may have less visibility over the traffic to be transmitted over the communications link. Additionally, coordination and communication between the different agents in real-time can be difficult so adding padding at a higher level can potentially cause congestion in the network and cause lost and/or delayed packets. Thus, adding padding within a frame or between frames at the link layer, such as by a physical transceiver device, can potentially have less impact on actual traffic communicated over the network than compared to adding padding at a higher layer.

Example Architectures for Encrypting Network Traffic Characteristics

Figure 2:
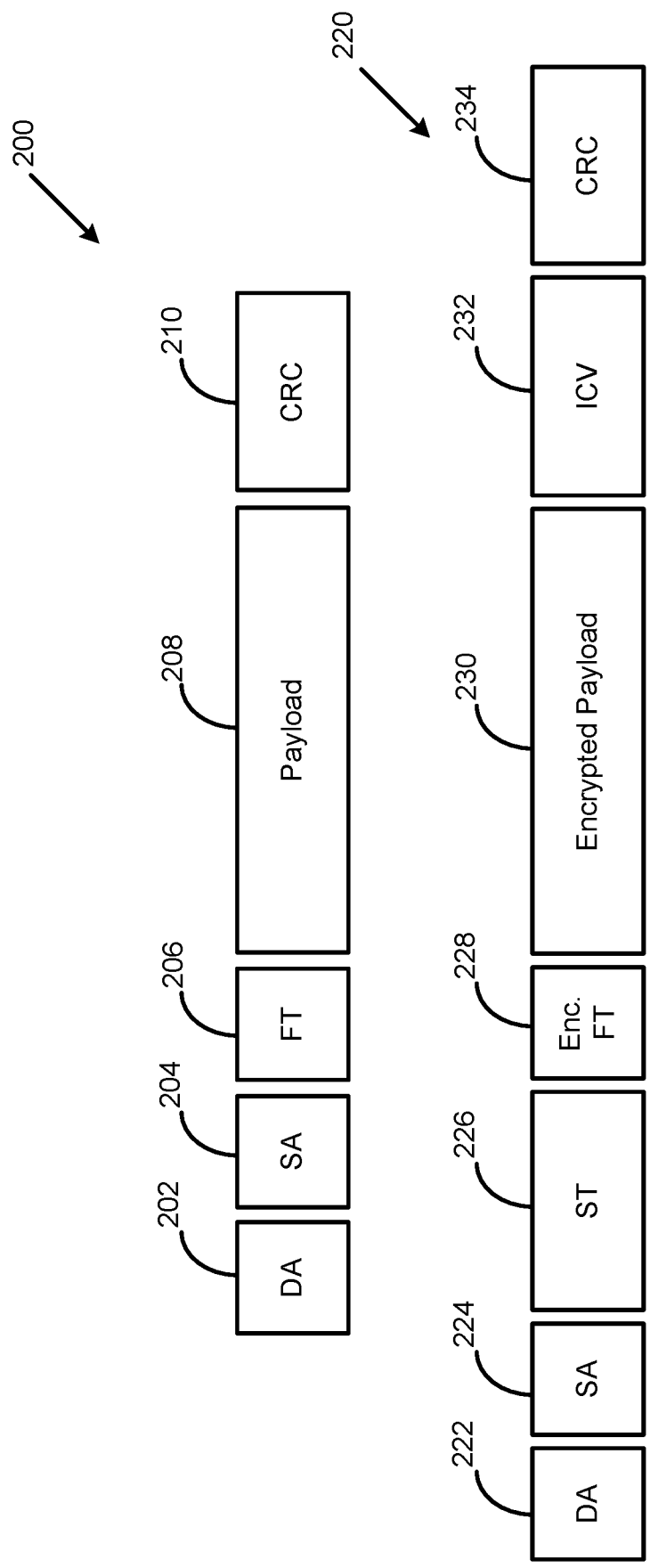
FIG. 2 illustrates example network packets.
Figure 3:
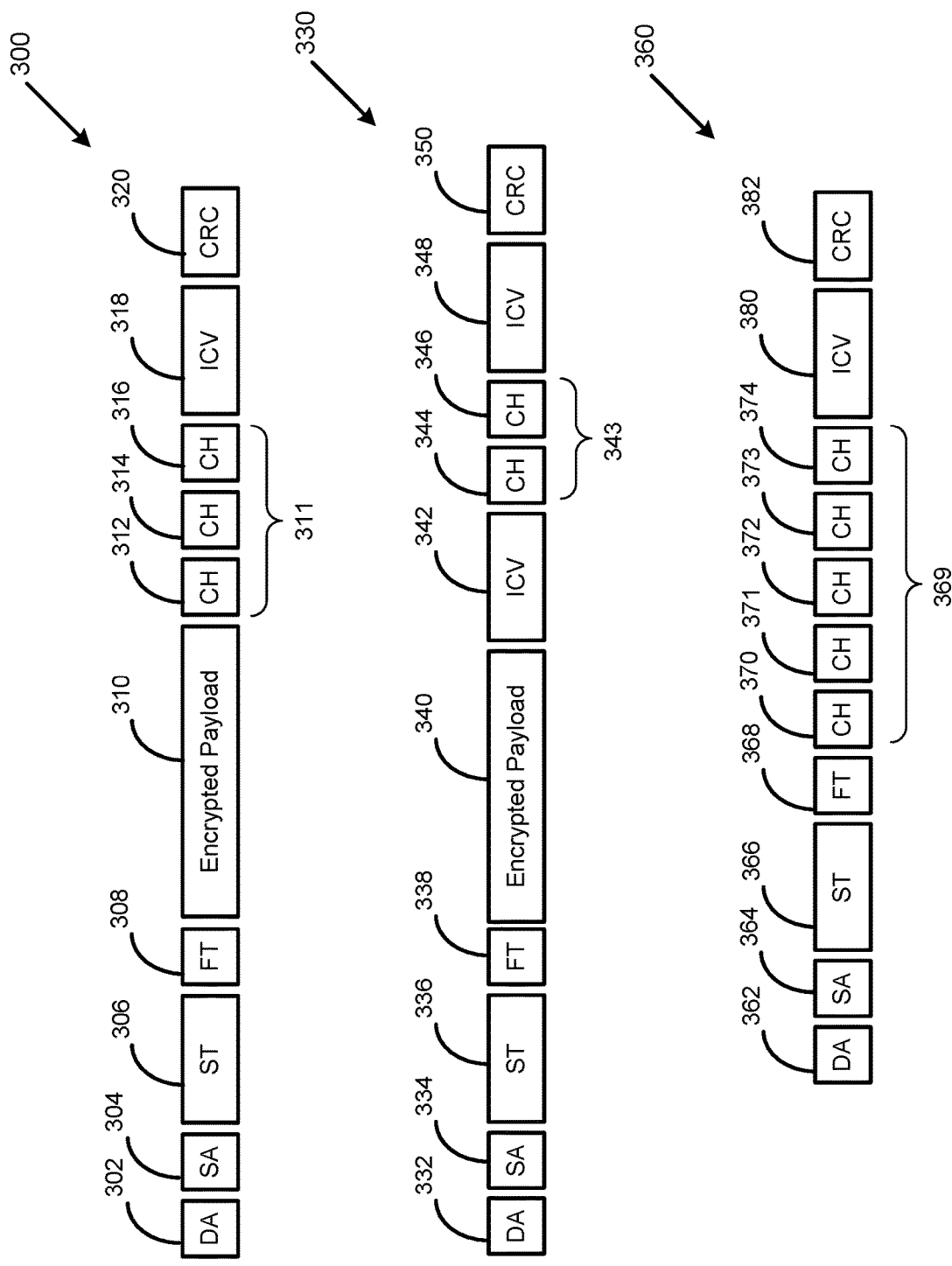
FIG. 3 illustrates example network packets having encrypted fields.
Figure 4:
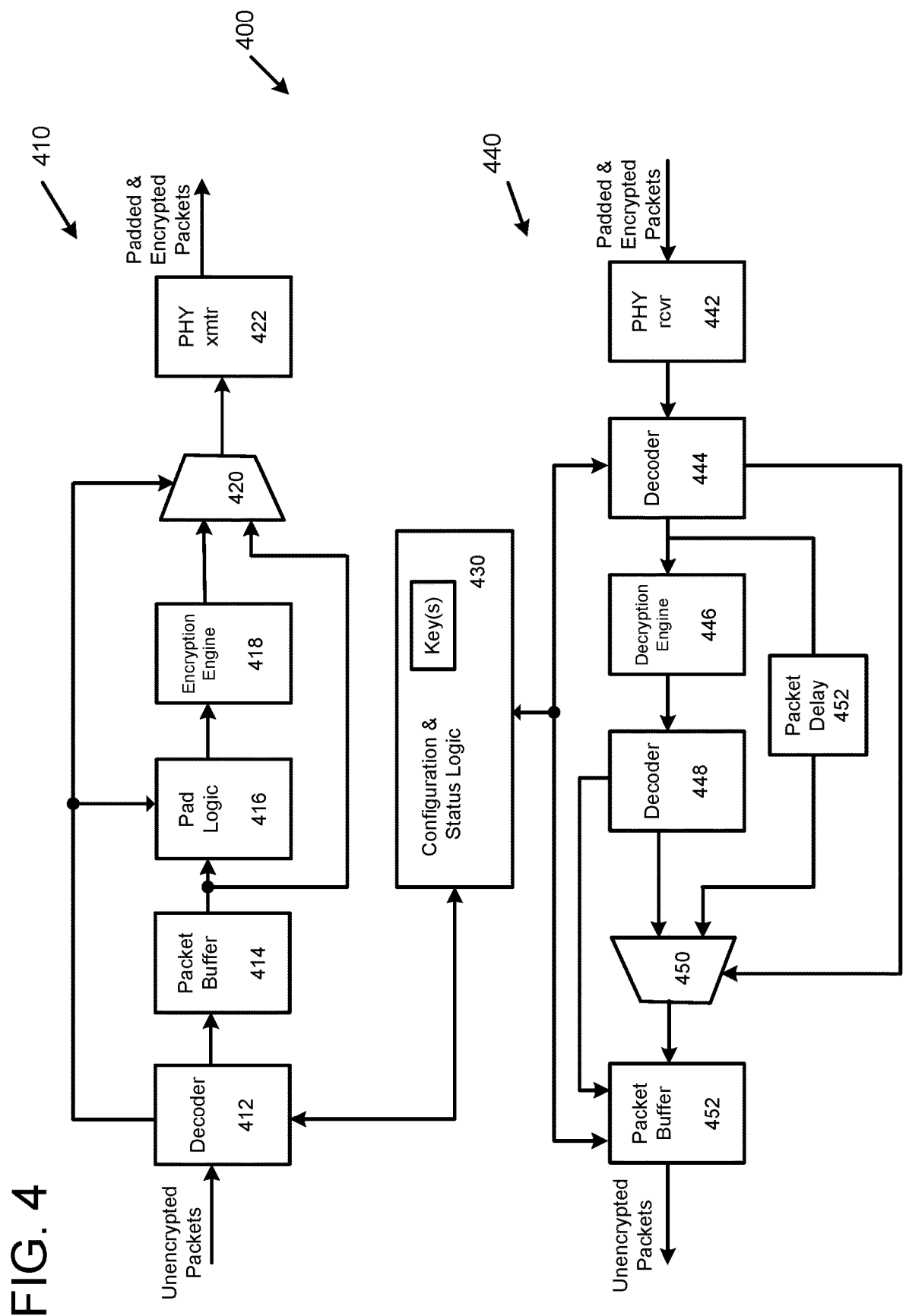
FIG. 4 is a system diagram showing an example microarchitecture of a physical transceiver device.
Figure 5:
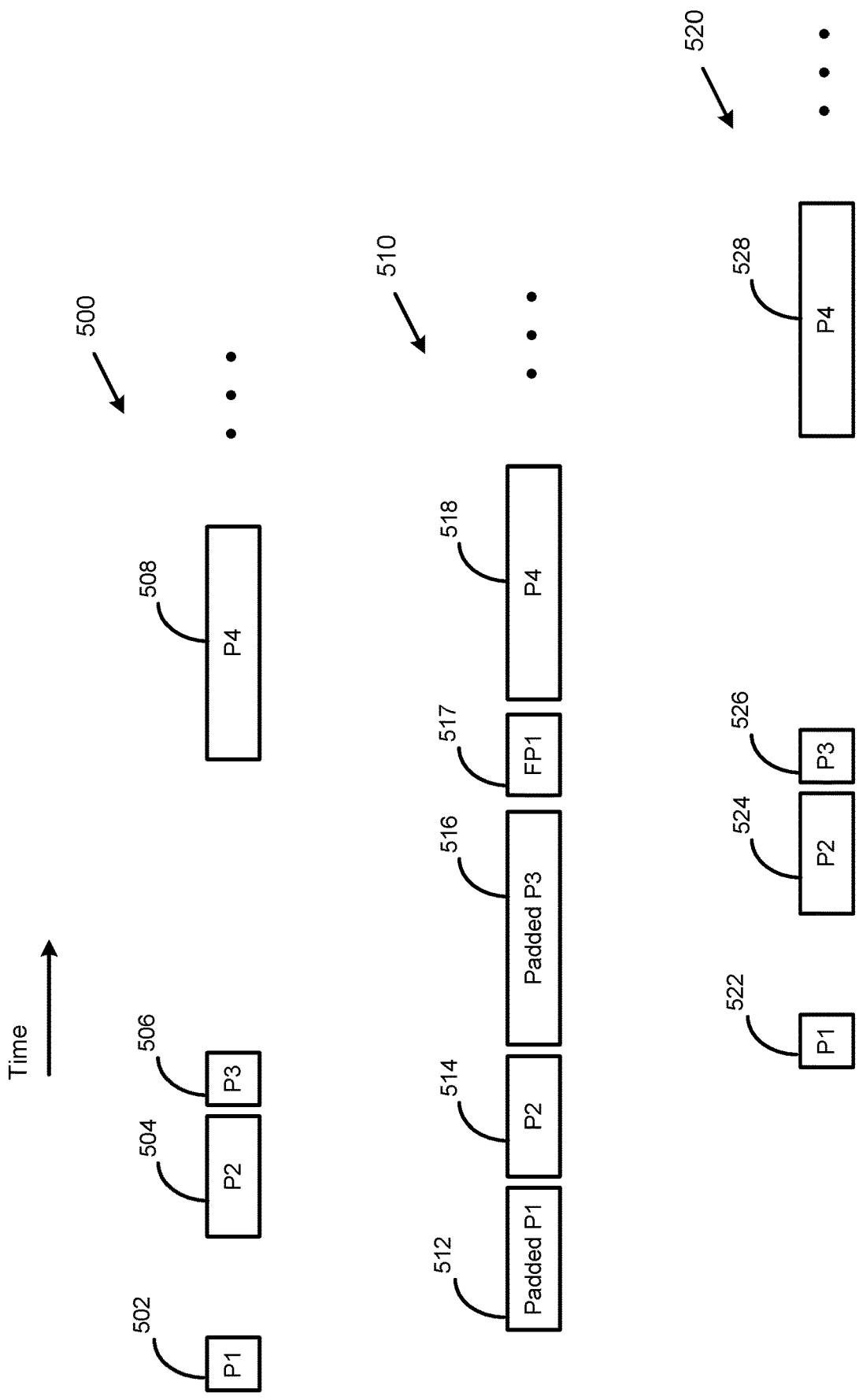
FIG. 5 illustrates an example timing diagram of network packets transiting a network.

FIGS. 1-5 illustrate various aspects of an architecture for encrypting network traffic characteristics. FIG. 1 illustrates a system for encrypting the characteristics of network traffic transiting a network. The network traffic can include a series of network packets. The characteristics of the network traffic can be obscured by padding the individual packets and by inserting filler packets between the individual packets. FIGS. 2-3 illustrate specific examples of network packets. FIG. 2 illustrates an unencrypted link layer packet and an encrypted link layer packet. FIG. 3 illustrates two specific examples of padded link layer network packets and a specific example of a link layer filler packet. The architecture can include a physical transceiver device. FIG. 4 illustrates an example microarchitecture of a physical transceiver device that can be used to pad the individual packets and insert the filler packets into the network traffic. FIG. 5 illustrates an example timing diagram of network packets transiting a network implementing the disclosed architecture.

FIG. 1 is a system diagram showing an example of a system 100 for encrypting the characteristics of network traffic transiting a network. For example, network traffic can be communicated between the network devices 110 and 150 over one or more network links 130. Each of the network devices 110 and 150 can be an endpoint of the network or an internal node (such as a switch) of the network. As specific examples, the types of network devices 110 and 150 can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, wireless access points, server computers, and client computers. In particular, the network devices 110 and 150 can be capable of sourcing, consuming, and/or forwarding a network packet. The network devices 110 and 150 can communicate with physical transceiver devices (PHYs) 120 and 140, respectively. As one example, network device 110 can transmit and receive unencrypted link layer packets to and from the PHY 120; and the network device 150 can transmit and receive unencrypted link layer packets to and from the PHY 140. As another example, the PHYs 120 and 140 can be integrated within the network devices 110 and 150, respectively.

The PHYs 120 and 140 can be used for translating between the link layer and the physical layer. The PHYs 120 and 140 can include a transmit datapath and a receive datapath. The transmit datapath can receive unencrypted link layer packets. Generally, all or a portion of an unencrypted link layer packet can be encrypted, combined with a padding field, and encapsulated within a payload of an encrypted link layer packet and/or a physical layer packet. Thus, the encapsulating packet can include a padded and encrypted version of the information present in the unencrypted link layer packet. The padding can be encrypted and can be a variable length so that the size of the unencrypted link layer packet cannot be readily discerned from the size of the encapsulating packet. The encapsulating packet can be transmitted over the network link 130. The network link 130 can include an electrical cable, a fiber-optic cable, connectors, repeaters, and/or an antenna, for example. The receive datapath can receive the encapsulating packet including the padded and encrypted version of the information from the unencrypted link layer packet. The receive datapath can decrypt the encrypted portions of the packet and strip out the padding to recover the information contained in the unencrypted link layer packet.

Additionally, the PHYs 120 and 140 can insert and strip out filler packets. Specifically, the transmit data path can insert filler packets and the receive data path can strip out filler packets. For example, the characteristics of network traffic can potentially be completely obfuscated when every packet is the same size and when filler packets are inserted during inter-packet gaps so that the network is operating at or near 100% utilization. However, making every packet the same size can potentially introduce undesirable delays in the transport of packets between different nodes of the network. Thus, a variable amount of padding can be used for each of the packets. As one example, no padding can be used for a first packet when the first packet is followed closely in sequence by a second packet. As another example, a packet can be padded out to a Maximum Transmission Unit (MTU) when the packet is followed by a relatively large gap before the next packet. The MTU can be the largest size packet that is allowed for a particular network protocol. Additionally, one or more filler packets can be inserted in the gap before the next packet arrives. As another example, a packet can be padded out to a size less than the MTU, based on a period of time between when an end of the packet is detected and when a beginning of the next packet is detected.

FIG. 2 illustrates example network packets 200 and 220. In particular, the network packet 200 can be an unencrypted link layer packet in the network packet 220 can be an encrypted link layer packet that encapsulates all or a portion of the network packet 200. The packet 200 can include multiple different fields, such as a header and a payload. It should be noted that the size of the fields of the packets in FIGS. 2-3 are not drawn to scale. Generally, a header is a data structure that provides information about how a packet is formatted and is used by peers to communicate with each other. The format of the header is determined based on the specific networking protocol associated with the header. Thus, a link layer header can be different from a network layer header, and an unencrypted Ethernet header can be different from an encrypted Ethernet header, for example. The header of the packet 200 can include subfields, such as a destination address (DA) field 202, a source address (SA) field 204, and a frame type (FT) field 206. As a specific example, the network packet 200 can be an Ethernet packet and the destination address 202 can be six octets or bytes, the source address 204 can be six octets, and the frame type 206 can be a two octet Ethertype. The destination address 202 can specify a Media Access Control (MAC) address assigned to the destination of the packet 200; the source address 204 can specify a MAC address assigned to the generator of the packet 200; and the Ethertype 206 can specify a type of the packet 200. The payload 208 can include information such as encapsulated packets from higher layers of the network protocol stack. As one example, the payload can vary in size from zero octets to 1500 octets. As another example, the payload can vary in size from zero octets to 9000 octets. Additionally, a checksum or cyclic redundancy check (CRC) field 210 can be appended to the end of the packet 200 and used to verify the contents of the packet 200. An Ethernet frame can include a CRC field 210 that is four octets long.

The network packet 220 can be an encrypted link layer packet, such as a MACsec packet. Specifically, the network packet 220 can encapsulate all or a portion of the packet 200. The header of the packet 220 can include a destination address (DA) field 222, a source address (SA) field 224, and a security tag (ST) field 226. The destination address 222 and the source address 224 can be taken directly from the destination address 202 and the source address 204 of the packet 200. The security tag field 226 can include subfields such as an Ethertype field set to the value 0x88E5 (identifying the packet 220 as a MACsec packet), a tag control information field, a channel association number field, a link field, a packet number field, and a secure channel identifier field. The payload of the network packet 220 can include an encrypted frame type field 228 and an encrypted payload 230, which are encrypted versions of the frame type field 206 and the payload 208 from the packet 200. The integrity check value 232 can be selected to authenticate the header and the payload of the network packet 220. For example, the integrity check value 232 can be the output of a cryptographic algorithm that uses a session key provided by the MACsec Key Agreement Protocol and the header and payload of the network packet 220 as inputs. Additionally, a CRC field 234 can be appended to the end of the packet 220 and used to verify the contents of the packet 220.

FIG. 3 illustrates an example of network packets having padding and encrypted fields. Specifically, the packets 300 and 330 illustrate packets with encrypted payloads and padding and the packet 360 illustrates a filler packet. The packet 300 includes the fields previously described plus an additional variable length padding field 311. In particular, the packet 300 includes a destination address field 302, a source address field 304, a security tag field 306, an encrypted frame type field 308, an encrypted payload field 310, an integrity check value field 318, and a CRC field 320. The variable length padding field 311 can include one or more subfields, such as the chained headers (CH) 312, 314, and 316. For example, each of the chained headers can include a value identifying the subfield as a chained header type. Each of the chained headers can include a value indicating whether another chained header follows the present chained header or whether the present chained header is the last header in the chain. As a specific example, the chained header 312 can indicate the chained header 314 follows it; the chained header 314 can indicate the chained header 316 follows it; and finally the chained header 316 can indicate that it is the last chained header of the padding field 311. In this manner, the length of the padding field 311 can be determined by decoding each of the individual chained header subfields 312, 314, and 316. The padding field 311 can be encrypted so that an observer of the packet 300 cannot easily discern that the padding field 311 is being used as padding. Thus, the encrypted frame type field 308, the encrypted payload field 310, and the padding field 311 can all be encrypted. The integrity check value 318 can be used to authenticate all of the fields of the packet 300 that precede the integrity check value 318. The CRC field 320 can be used to verify all of the contents of the packet 300.

The size of the variable length padding field 311 can be selected based on a variety of factors. As one example, the size of the encrypted payload 310 can be used to determine the size of the variable length padding field 311. In particular, if the size of the encrypted payload 310 is the MTU for the communications protocol, no padding field will be added so that the MTU is not exceeded. However, if the size of the encrypted payload 310 is less than the MTU, then the padding field 311 can be sized so that the sizes of the encrypted payload 310 and the padding field 311 added together are equal the MTU. As another example, the size of the variable length padding field 311 can be based on the period of time between when an end of the encapsulated packet arrives and when the beginning of the next packet arrives. Specifically, when two packets arrive back-to-back with no inter-packet gap, the earlier packet may have no padding field. When two packets are separated by a relatively small inter-packet gap, the padding field of the earlier packet can be sized to fill the inter-packet gap. When two packets are separated by a relatively large inter-packet gap, the padding field of the earlier packet can be sized so that the earlier packet is increased to the MTU.

The padding field 311 can potentially delay the encrypted payload 310 as it transits the network. For example, the integrity check value 318 cannot be used to authenticate the packet 300 until the entire padding field 311 has been received. Thus, the encrypted payload 310 can be delayed by the time that it takes for the padding field 311 to be transmitted. However, the packet 330 can be used to potentially reduce the delay associated with determining whether the encrypted payload 340 is authentic. In particular, the packet 330 can include multiple integrity check values, where a first integrity check value 342 can be used to authenticate the fields that precede the first integrity check value 342, and a second integrity check value 348 can be used to authenticate the fields that precede the second integrity check value 348. The first integrity check value 342 can be used to authenticate the destination address field 332, the source address field 334, the security tag field 336, the encrypted frame type 338, and the encrypted payload 340. The second integrity check value 348 can be used to authenticate the destination address field 332, the source address field 334, the security tag field 336, the encrypted frame type 338, the encrypted payload 340, and the padding field 343.

The network packet 360 is a filler packet. The filler packet 360 can include a destination address field 362, a source address field 364, a security tag 366, a frame type 368, a variable length padding field 369, an integrity check value field 380, and a CRC field 382. The frame type 368 can identify a type of the packet 360 as being a filler packet. For example, a value selected for the frame type 368 can be selected from a reserved Ethertype field. Thus, when the filler packet is received by a remote node, it can be identified as a filler packet and discarded. The variable length padding field 369 can include one or more subfields such as the chained headers 370-374. In this example, each of the chained headers 370-373 can indicate that a chained header follows it, and the chained header 374 can indicate that it is the last chained header. The frame type 368 and the padding field 369 can be encrypted so that an observer of the filler packet 360 cannot readily discern that the packet is a filler packet. The integrity check value 380 can be used to authenticate that the filler packet 360 has not been modified. The filler packets can be inserted by a PHY during an inter-packet gap, for example.

FIG. 4 is a system diagram showing an example microarchitecture of a physical transceiver device 400. The physical transceiver device 400 can include a transmit data path 410, a receive data path 440, and configuration and status logic 430. In some examples, the physical transceiver device 400 can be implemented using software and/or hardware, where the hardware can include one or more of: hardwired digital logic, programmable microcode, programmable gate arrays, computer-readable storage media, or other suitable control circuits.

The transmit data path 410 can be pipelined so that multiple operations of the transmit data path 410 can occur concurrently. The transmit data path 410 can receive unencrypted link layer packets at an input of the pipeline, generate padded and encrypted link layer packets at one stage of the pipeline, and output padded and encrypted physical layer packets from an output of the pipeline. The pipeline can include a decoder stage 412 for decoding incoming unencrypted link layer packets. The decoder stage 412 can parse an unencrypted link layer packet into different fields. Specifically, the decoder stage 412 can identify the destination address field, the source address field, the frame type, and the payload of the unencrypted link layer packet. The decoder stage 412 can determine whether the unencrypted link layer packet is to be encrypted and padded or whether the unencrypted link layer packet is to be transmitted unencrypted. For example, the decoded fields of the packet can be used to determine if the packet will be encrypted. When the packet is to be encrypted, the decoder stage 412 can generate and insert a security tag field for the packet. The decoder stage 412 can determine a size of the payload of the unencrypted link layer packet. For example, the payload of the packet can include an encapsulated packet from a higher level of the network stack and the encapsulated packet can be decoded to determine a size of the payload. The decoded destination address and source address can pass through the transmit pipeline 410 unmodified and can form the destination address and source address of the encrypted link layer packet. The security tag can also pass through the later stages of the transmit pipeline 410 unmodified to form the security tag of the encrypted link layer packet.

The packet buffer 414 can provide temporary storage for a packet while later stages of the transmit pipeline 410 are being used for an earlier packet. The packet buffer 414 can be implemented in various sizes. As one example, the packet buffer 414 can be sized so that it is large enough to hold an MTU packet. As another example, the packet buffer 414 can be sized so that it is large enough to account for any delays in the pipeline stages following it (e.g., it can be two or three times larger than the size of the chained header subfield). Packets that are to be transmitted unencrypted can bypass the pad logic stage 416 and the encryption engine stage 418. Packets that are to be transmitted encrypted and/or padded can be routed through the pad logic stage 416. The pad logic stage 416 can generate the padding field for the encrypted link layer packet. As described above, the padding field can include one or more chained header subfields. The pad logic stage 416 can continue to add chained header subfields until either the MTU is reached for the packet or the decoder 412 detects that a new packet has arrived at the input of the transmit pipeline 410. Additionally, the pad logic 416 can insert filler packets during inter-packet gaps. For example, when the packet buffer 414 is empty and the decoder 412 determines there is currently no unencrypted packets at the input of the transmit pipeline 410, the pad logic 416 can generate a header for a filler packet and can create a variable length padding field having one or more chained header subfields. The padding field can be increased in size until either an MTU for the filler packet is reached or a packet is detected at the input of the transmit pipeline 410.

The encryption engine 418 can encrypt the fields of the packet that are to be encrypted. For example, the frame type field, the payload, and the padding field can be encrypted as the fields are passed through the encryption engine stage 418. Additionally, the encryption engine 418 can generate the integrity check value field and the CRC field for the encrypted link layer packet and the filler packet. The encryption engine 418 can use a key or keys stored in the configuration and status logic 430 as inputs for generating the encrypted data stream, the integrity check value field, and the CRC field. The multiplexing logic 420 can select between an encrypted link layer packet or filler packet being output from the encryption engine 418 and an unencrypted link layer packet being output from the packet buffer 414. The PHY transmitter 422 can convert the link layer packets into physical layer packets that can be transmitted across a physical communication link.

The receive data path 440 can be pipelined so that multiple operations of the receive data path 440 can occur concurrently. The receive data path 440 can receive encrypted or unencrypted physical layer packets at an input of the pipeline, decrypt the encrypted link layer packets, strip off or drop filler packets and padding fields, and output unencrypted link layer packets from an output of the pipeline. The pipeline can include a PHY receiver stage 442 that can convert the physical layer packets transmitted across the physical communication link to link layer packets. The unencrypted fields of the link layer packets can be parsed and decoded by the decoder stage 444. For example, the unencrypted fields can include the destination address, the source address, and the frame type. If the frame type indicates that the packet is unencrypted, than the packet can be routed through the packet delay pipeline stage 452. The packet delay pipeline stage 452 can be used to match the delays through the decryption engine 446 and the decoder 448 pipeline stages. If the frame type indicates that the packet is encrypted (such as when the frame type indicates the frame is a MACsec packet), the packet can be processed by the decryption engine stage 446. The decryption engine 446 can use the keys stored in the configuration and status logic 432 decrypt the encrypted fields of the encrypted link layer packet. Additionally, the decryption engine 446 can be used to authenticate all or a portion of the encrypted link layer packet using one or more integrity check values and/or the CRC field of the packet. The decoder stage 448 can be used to decode the fields of the packet that were unencrypted by the decryption engine 446. For example, the decoder stage 448 can detect the padding field and can mark the padding field as data to be dropped or stripped from the output stream of the receive pipeline 440. The multiplexing logic 450 can be used to select between the decryption pipeline stages 446 and 448 and the unencrypted packet delay stage 452. The output of the multiplexing stage 450 can be used as an input to the packet buffer stage 452. The packet buffer stage 452 can be used to provide temporary storage while the packet is being authenticated. For example, all or a portion of the packet can be buffered in the packet buffer 452 until the integrity check value of the packet has been received and verified by the decryption engine 446. When the packet has been authenticated, the packet can be output from the packet buffer 452 so that the receive pipeline 440 can output unencrypted link layer packets.

The configuration and status logic 430 can be used to configure or program the physical transceiver device 400 and to generate status data associated with the physical transceiver device 400 and/or the characteristics of the network traffic. As one example, the configuration and status logic 430 can be accessed by directing a link layer packet to the configuration and status logic 430. In one embodiment, a packet bound for the configuration and status logic 430 can include a destination address that is reserved for the configuration and status logic 430. In another embodiment, a packet bound for the configuration and status logic 430 can include a frame type that is reserved to access the configuration and status logic 430. In another embodiment, the configuration and status logic 430 can be accessed from an interface that is different from the link layer packet data path.

As one of example of information that can be programmed using the configuration and status logic 430, a target packet size can be programmed. The target packet size can be the MTU of the link layer protocol or a size that is smaller than the MTU. As another example, a size of the chained header subfields of the padding field can be programmed. Having a smaller subfield can provide more granularity for the padding field and for the filler packet. The smaller granularity may potentially reduce delay of the packets transiting the network. However, a smaller subfield can potentially cause the physical transceiver device 400 to use more power encoding and decoding the padding fields. As another example, the configuration and status logic 430 can be used to program a mode to define where the padding field is inserted into the padded and encrypted link layer packet. In the first mode, the padding field can be inserted after the encrypted payload and before the integrity check value. However, this mode may potentially increase delay of the packets through the network while the padding field is being authenticated. In the second mode, the padding field can be inserted after a first integrity check value and before a second integrity check value. In this mode, the authenticated portion of the packet can cut through the receive data path before the second integrity check value is verified. Thus, the packet may be delivered with less delay than when using the first mode. As another example, options for random number generation can be exposed to the programmer. Specifically, the chained header subfield can include random data that is generated by a random number generator. The random number generator can operate in one or more modes that are programmable. As another example, keys used to encrypt data and/or generate the integrity check value or the CRC value can be programmed and stored in the configuration and status logic 430.

The configuration and status logic 430 can also monitor network traffic flowing through the physical transceiver device 400. For example, the padded and encrypted packets and the filler packets transiting over the physical layer can approach a link utilization of 100%. Generally, a network provider may use a utilization of the links of the network to determine when to scale up or increase the network resources of the network. However, simply using the raw utilization of the links carrying the padded and encrypted stream of packets can yield a pessimistic view of the network utilization since the utilization can be close to 100%. The configuration and status logic 430 can monitor the unencrypted packets entering the transmit pipeline 410 and the unencrypted packets exiting the receive pipeline 440. At this point in the pipeline, the padding fields and the filler packets are stripped out and the resulting bandwidth and/or utilization can provide a more accurate representation of how busy the network link is.

FIG. 5 illustrates an example timing diagram of a series or stream of network packets as they transit across a network architecture as disclosed herein. In this illustration, the packet sizes are roughly to scale. The stream of packets 500 can be received at an input of a transmit data path of a physical transceiver device. The packet 502 (P1) is the first packet to arrive in the stream 500. There is an inter-packet gap between the packet 502 and the packet 504 (P2). There is no inter-packet gap between the packet 504 and the packet 506 (P3). There is a relatively large inter-packet gap between the packet 506 and the packet 508 (P4). The packet 508 has a size matching the MTU of the link layer, and the inter-packet gap between packets 506 and 508 is greater than the MTU.

The stream of packets 500 can be processed by the transmit data path of the physical transceiver device to generate the stream of packets 510. The stream of packets 510 has been padded and filled with filler packets so that the link utilization of the stream of packets 510 is closer to 100%. In contrast, the stream of packets 500 has inter-packet gaps between some of the packets and so the utilization is farther from 100%. As illustrated, the packet 512 is an encrypted and padded version of the packet 502. The padding of the packet 512 has been selected to fill the inter-packet gap between the packet 502 and the packet 504. The packet 514 is an encrypted version of the packet 504. The packet 514 is transmitted without padding because the packet 506 arrived with no inter-packet gap after the packet 504. The packet 516 is an encrypted and padded version of the packet 506. The padding of the packet 516 has been selected so that the packet 516 has a size matching the MTU. Since no packet is detected at the end of the packet 516, a filler packet 517 is inserted into the stream of packets 510. The size of the filler packet 517 is increased until the packet 508 is detected and then the filler packet 517 is completed. The packet 518 is an encrypted version of the packet 508. The packet 518 is not padded because the packet 508 has a size matching the MTU. By padding out and encrypting the packet stream 500 to create the packet stream 510, the characteristics of the packet stream 500 have been obfuscated. Specifically, the packet sizes, the inter-packet gaps, the pattern of the packets, the amount of packets, and the bandwidth of the packets cannot be readily discerned by an outside observer. By obfuscating the packet stream 500, the information stored within the packet stream 500 can potentially be kept more secure than if the packet stream 500 were not obfuscated.

The stream of packets 510 can be processed by a receive data path of a remote physical transceiver device to generate the stream of packets 520. The stream of packets 520 has been stripped of padding and of the filler packets so that the utilization of the stream 520 is the same or similar to the utilization of the stream 500. In particular, the padded and encrypted packet 512 has been decrypted and stripped of padding to generate the packet 522. The encrypted packet 514 has been decrypted to generate the packet 524. The packet 516 has been decrypted and stripped of padding to generate the packet 526. The filler packet 517 has been dropped from the stream 520. Finally, the packet 518 has been decrypted to generate the packet 528.

Example Methods for Encrypting Network Traffic Characteristics

Figure 6:
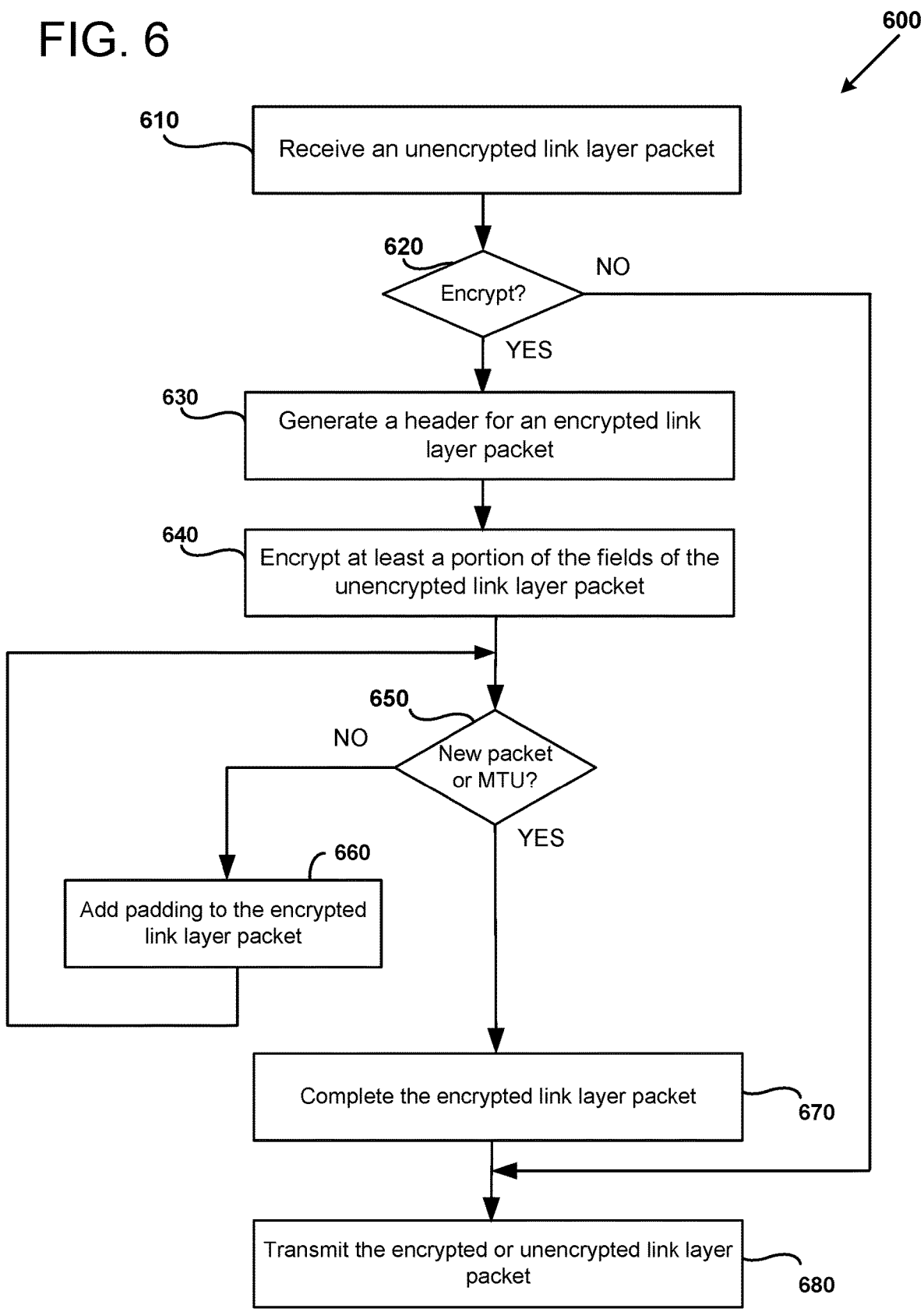
FIG. 6 is a flow diagram of an example method of encrypting and padding a link layer packet.

FIG. 6 is a flow diagram of an example method 600 of encrypting and padding a link layer packet. As one example, the method 600 can be implemented using a physical transceiver device architected as described above with reference to FIGS. 1-5. In particular, the method 600 can be implemented using a transmit pipeline of a physical transceiver device.

At 610, an unencrypted link layer packet can be received. The unencrypted link layer packet can include a header having one or more fields and a payload of a particular size. For example, the one or more fields can include a destination address, a source address, and the frame type. The payload can include an encapsulated packet from a higher layer in the network stack which can have additional fields.

At 620, it can be determined whether the unencrypted link layer packet is to be encrypted. The determination can be based upon link layer fields and/or fields of the higher level layers of an encapsulated packet. As a specific example, a value of the frame type can be compared to frame types that are to be encrypted. As another example, a source IP address and a destination IP address within the encapsulated packet can be used to determine whether the link layer packet will be encrypted. When the unencrypted link layer packet is not to be encrypted, the method 600 can continue at 680. When the unencrypted link layer packet is to be encrypted, the method 600 can continue at 630.

At 630, a header for an encrypted link layer packet can be generated. The header can include fields from the unencrypted link layer packet. For example, the source address and the destination address can be the same in the unencrypted link layer packet and in the header for the encrypted link layer packet. Additionally, the header can include a security tag. The security tag can include a frame type identifying the packet as an encrypted link layer packet. As a specific example, an encrypted Ethernet packet can include a frame type having a value of 0x88E5 so that it is identified as a MACsec packet. The security tag can also include tag control information, a channel association number, a short length, a packet number, and a secure channel identifier. For example, the tag control information, the channel association number, and the secure channel identifier can be based on fields of the unencrypted link layer packet. The channel association number and the secure channel identifier can be used to associate a particular key to the encrypted link layer packet so that the encrypted link layer packet can be decrypted by a remote node.

At 640, at least a portion of the fields of the unencrypted link layer packet can be encrypted. For example, the frame type and the payload of the unencrypted link layer packet can be encrypted. Other fields, such as the destination address and the source address of the unencrypted link layer packet can remain unencrypted as described above. A variable amount of time can be used to perform encryption, where the amount of time can be based on a length of the unencrypted link layer packet. As described above, an encryption engine can be pipelined with other functions of a physical transceiver device so that encryption of one part of the packet can occur while an earlier part of the packet is being transmitted (e.g., the packet can cut through) over a link connected to the physical transceiver device. The encryption engine can also be calculating an integrity check value and the CRC checksum as the unencrypted link layer packet is being processed. In one embodiment, a first integrity check value can be inserted at the end of the encrypted payload.

At 650, it can be determined whether the unencrypted link layer packet has a size matching the MTU or whether a new packet has arrived at an input of the physical transceiver device. As one example, the determination can be made when an end of the unencrypted link layer packet is detected. When the end of the unencrypted link layer packet has been detected, the payload is less than the MTU, and a new packet has not arrived, the method 600 can continue at 660. When a new packet arrives or the payload is equal to the MTU, the method 600 can continue at 670.

At 660, padding can be added to the encrypted link layer packet. The amount of padding can be based on the size of the payload of the unencrypted link layer packet. For example, the padding can be sized to increase the encrypted link layer packet up to the MTU. The format of the padding can be a series of uniform size chained header fields. Specifically, a given chained header field can be a fixed size and can indicate whether the chained header field is the last chained header field or whether a chained header field follows the present chained header field. The chained header fields can be encrypted so that it is not easily discernible by an observer that the fields are chained header fields. After a chained header field has been generated, the method 600 can loop back to 650 to determine whether the MTU has been reached for the padded link layer packet and whether a new packet has arrived. By looping on this condition, the padding field can be sized to fill inter-packet gaps while not exceeding the MTU for the padded link layer packet. Additionally, the size of the payload of the padded encrypted link layer packet can be different than the size of the payload of the unencrypted link layer packet so that the size of the unencrypted link layer packet is obfuscated when the padded encrypted link layer packet is transmitted.

At 670, the encrypted link layer packet can be completed. For example, an integrity check value can be appended to the outgoing encrypted link layer packet. Additionally, a CRC checksum can also be appended to the outgoing encrypted link layer packet.

At 680, the encrypted link layer packet (from 670) or the unencrypted link layer packet (from 620) can be transmitted. Transmitting the packet can include converting the link layer packet to a corresponding physical layer packet.

Figure 7:
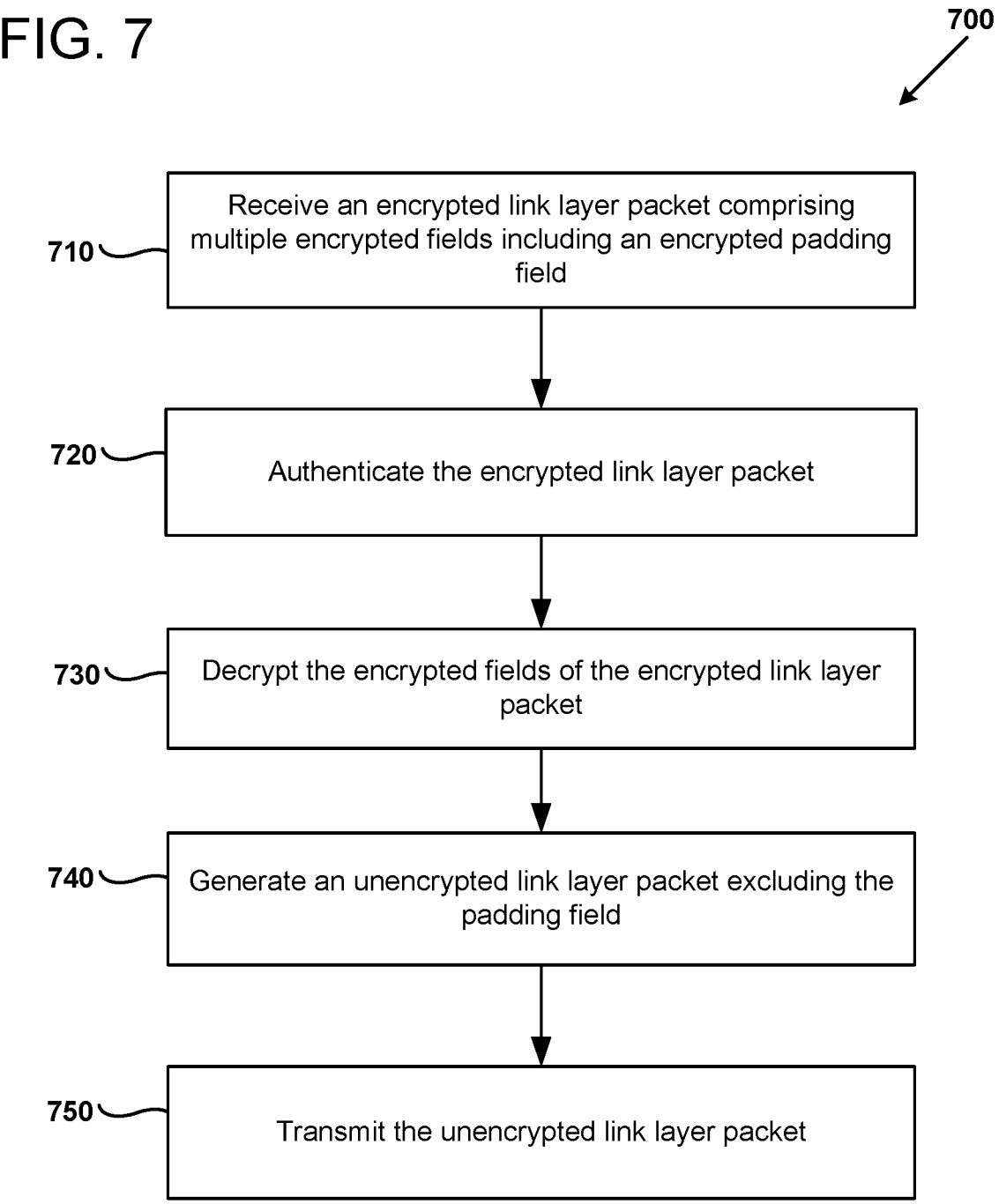
FIG. 7 is a flow diagram of an example method of receiving and decrypting an encrypted link layer packet.

FIG. 7 is a flow diagram of an example method 700 of receiving and decrypting an encrypted link layer packet. As one example, the method 700 can be implemented using a physical transceiver device architected as described above with reference to FIGS. 1-5. In particular, the method 700 can be implemented using a receive pipeline of a physical transceiver device.

At 710, an encrypted link layer packet can be received. The encrypted link layer packet can include multiple encrypted fields including an encrypted padding field and an encrypted inner payload. Receiving the encrypted link layer packet can include converting a physical layer packet into the encrypted link layer packet. The encrypted link layer packet can also include unencrypted fields such as a source address, a destination address, and a security tag. For example, the unencrypted fields can be used to identify a particular key that can be used to decrypt the encrypted link layer packet and/or to authenticate the encrypted link layer packet.

At 720, the encrypted link layer packet can be authenticated. The authentication can occur in multiple stages. For example, a first integrity check value can be used to authenticate fields (e.g., the encrypted payload and the encrypted frame type) of the encrypted link layer packet that precede a padding field. When these fields are authenticated, that portion of the packet can be forwarded to a network device, for example. By providing an integrity check value that does not include the padding field, the payload within the encrypted link layer packet can potentially be forwarded to the network device sooner than if the integrity check value was used to also authenticate the padding field. A second integrity check value can be used to authenticate the padding field and the fields that precede the padding field. A CRC checksum can provide an additional layer of authentication for the encrypted link layer packet.

At 730, the encrypted fields of the encrypted link layer packet can be decrypted. For example, a key selected based on the unencrypted fields of the encrypted link layer packet can be used as an input to a cryptographic function to perform the decryption. When the fields are decrypted, the fields can be parsed and decoded.

At 740, an unencrypted link layer packet can be generated. The unencrypted link layer packet can exclude the padding field so that the padding and encryption is transparent to layers above the link layer. Additionally, the link layer packet excluding the padding field can be stored and transferred with reduced overhead. The unencrypted link layer packet can include a source address, a destination address, an unencrypted frame type, and an unencrypted payload. The source address and the destination address can be taken from the unencrypted source address and destination address fields of the encrypted link layer packet. Additionally, a CRC checksum can be generated for the unencrypted link layer packet.

At 750, the unencrypted link layer packet can be transmitted. For example, the unencrypted link layer packet can be transmitted to a network device or a storage device.

Figure 8:
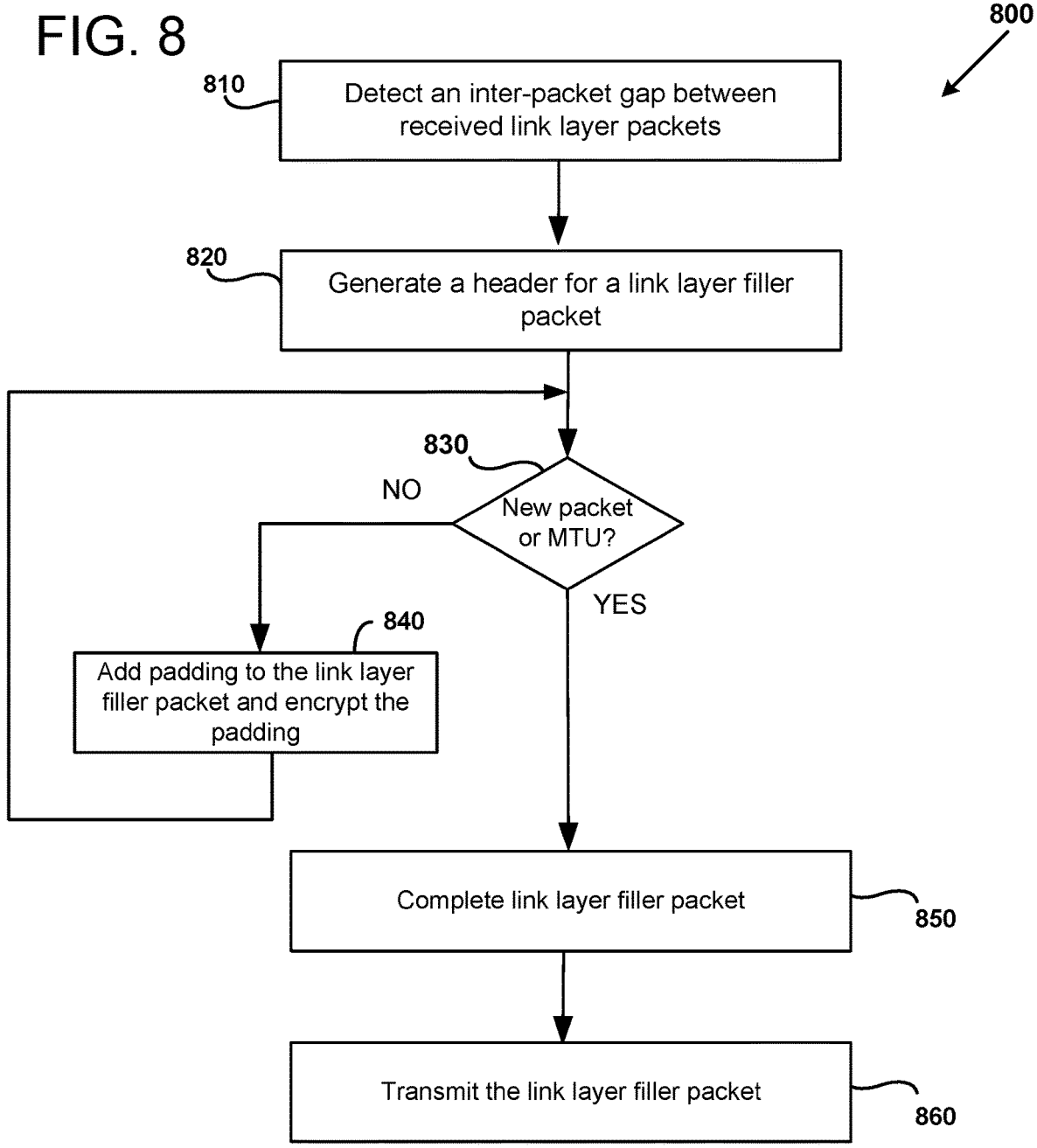
FIG. 8 is a flow diagram of an example method of generating a link layer filler packet.

FIG. 8 is a flow diagram of an example method 800 of generating a link layer filler packet. As one example, the method 800 can be implemented using a physical transceiver device architected as described above with reference to FIGS. 1-5. In particular, the method 800 can be implemented using a transmit pipeline of a physical transceiver device.

At 810, an inter-packet gap can be detected between received link layer packets. As one example, an inter-packet gap can include the period of time between an end of the first packet and a beginning of a following packet. As another example, an inter-packet gap can be detected when there is idle time at an input of a transmit pipeline of a physical transceiver device.

At 820, a header for a link layer filler packet can be generated. The header can include a source address, a destination address, and a frame type. As one example, the source address can be a MAC address of a physical transceiver device or a network device connected to the physical transceiver device. The destination address can be a MAC address of a remotely connected physical transceiver device or a network device connected to the remote physical transceiver device. The frame type can include a value that identifies the packet as a link layer filler packet.

At 830, it can be determined if a new packet is received or if the link layer filler packet matches the size of the MTU. If a new packet is received, ending the inter-packet gap, the method 800 can continue at 850. If a new packet is not received and the link layer filler packet does not match the size of the MTU, the method 800 can continue at 840.

At 840, padding can be added to the link layer filler packet. For example, the padding can include one or more chained header subfields of a fixed size (such as four octets). A given chained header subfield can include an identifier that indicates the subfield is a chained header, a status bit indicating whether the chained header subfield is the last chained header or whether a chained header subfield follows the present chained header subfield, and random data. The length of the random data can be a difference between the size of the chained header subfield and a sum of the sizes of the identifier and the status bit. Alternatively, the random data can be replaced with a predetermined value, such as all zeros or all ones. After a chained header subfield has been generated, the chained header subfield can be encrypted, and the method 800 can loop back to 830 to determine whether the MTU has been reached for the link layer filler packet and whether a new packet has arrived. By looping on this condition, the filler packet can be sized to fill inter-packet gaps while not exceeding the MTU for the link layer filler packet. For relatively long inter-packet gaps, multiple link layer filler packets having a size matching the MTU can be generated during the gap.

At 850, the link layer filler packet can be completed. For example, an integrity check value can be calculated for the link layer filler packet and inserted into the transmit pipeline. As another example, a CRC checksum value can be calculated and inserted into the transmit pipeline. Thus, the link layer filler packet can include a source address, a destination address, a frame type, an encrypted payload (e.g., the padding field), an integrity check value, and a CRC value.

At 860, the link layer filler packet can be transmitted. Transmitting the link layer filler packet can include converting the link layer filler packet to a corresponding physical layer packet.

Figure 9:
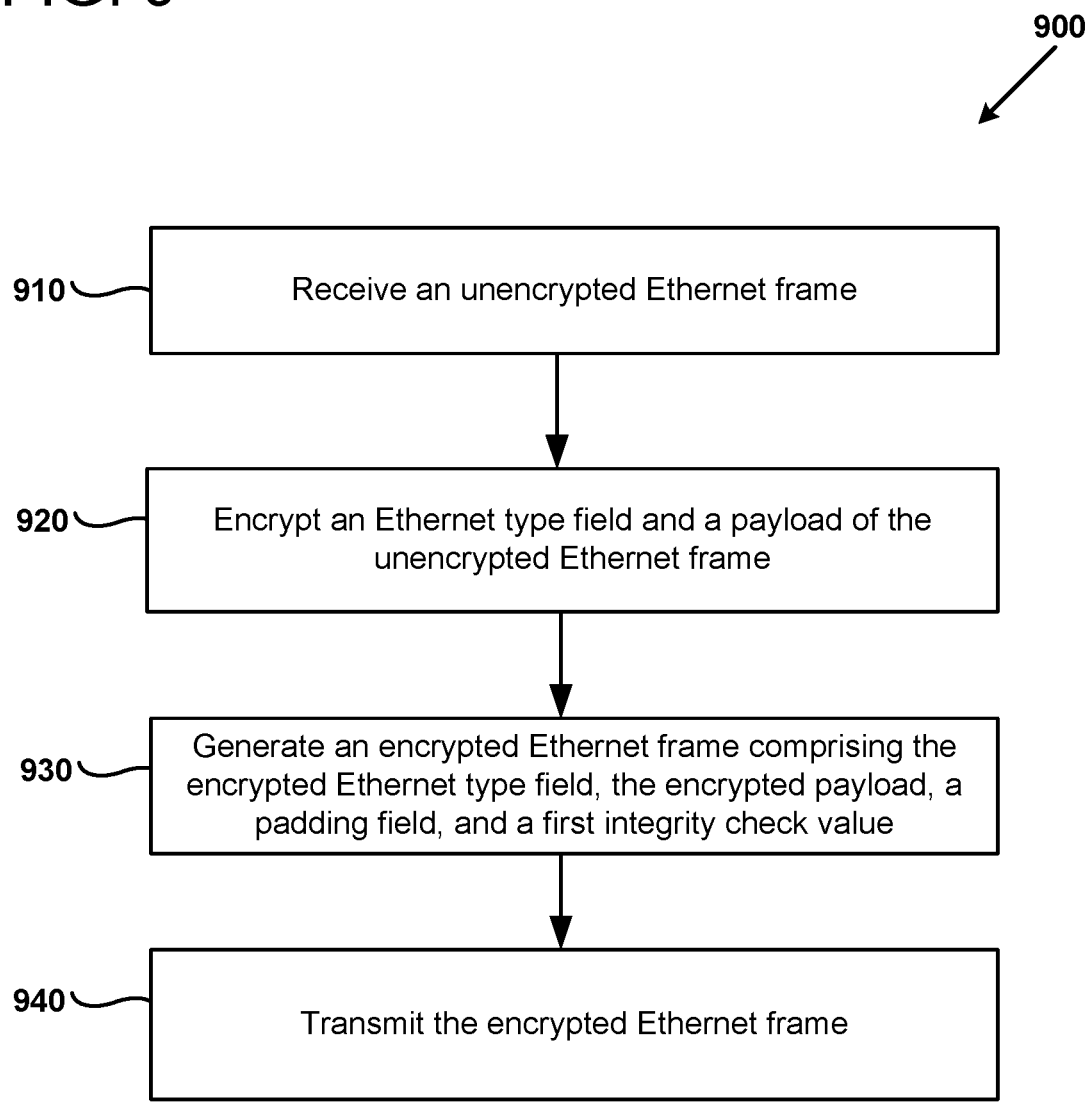
FIG. 9 is flow diagram of an example method of encrypting and padding an Ethernet frame.

FIG. 9 is flow diagram of an example method 900 of encrypting and padding an Ethernet frame. As one example, the method 900 can be implemented using a physical transceiver device architected as described above with reference to FIGS. 1-5. In particular, the method 900 can be implemented using a transmit pipeline of a physical transceiver device.

At 910, an unencrypted Ethernet frame can be received. The unencrypted Ethernet frame can have a first size and can include an Ethernet type field and a payload. The unencrypted Ethernet frame can also include a MAC source address, a MAC destination address, and a CRC field. The payload can include an encapsulated packet from higher layers of the network stack.

At 920, the Ethernet type field and the payload of the unencrypted Ethernet frame can be encrypted. For example, a key can be selected based on various fields of the unencrypted Ethernet frame and/or an encapsulated packet within the payload of the Ethernet frame. The key, the Ethernet type field, and the payload of the unencrypted Ethernet frame can be used as inputs into a cryptographic function to create the encrypted Ethernet type field and the encrypted payload.

At 930, an encrypted Ethernet frame can be generated. The encrypted Ethernet frame can include the encrypted Ethernet type field, the encrypted payload, a padding field sized to obfuscate the size of the unencrypted Ethernet frame, and a first integrity check value selected to authenticate at least a portion of the encrypted Ethernet frame. As one example, the padding field can include a number of subfields and the number of subfields can be based on a period of time between when an end of the unencrypted Ethernet frame is detected and when a beginning of a next unencrypted Ethernet frame is detected. The padding field can include a first field chained to a second field, and the second field can indicate an end of the padding field. Thus, the padding field can be a variable length depending on a number of chained fields that are present in the padding field. The padding field can be encrypted so that the function of the padding field cannot clearly be determined unless the padding field is decrypted. The encrypted Ethernet frame can include multiple different integrity check values. For example, the first integrity check value can be used to authenticate the header and the payload of the encrypted Ethernet frame. A second embedded integrity check value can be used to authenticate the encrypted Ethernet type field and the inner encrypted payload from the unencrypted packet, but not the padding field. The second embedded integrity check value can be encrypted.

At 940, the encrypted Ethernet frame can be transmitted. Additionally, filler Ethernet frames can be transmitted, such as during inter-packet gaps between the arrival of unencrypted Ethernet frames. Specifically, a filler Ethernet frame can be generated in response to detecting an inter-frame gap between received unencrypted Ethernet frames. The filler Ethernet frame can include a padding field and an Ethernet type field indicating the frame is a filler Ethernet frame. The filler Ethernet frame can be encrypted to generate an encrypted filler Ethernet frame. The encrypted filler Ethernet frame can be transmitted. Thus, using padding within a given Ethernet frame and using the filler Ethernet frames, the characteristics of the unencrypted Ethernet packets can be obfuscated or encrypted.

Example Computing Environment

Figure 10:
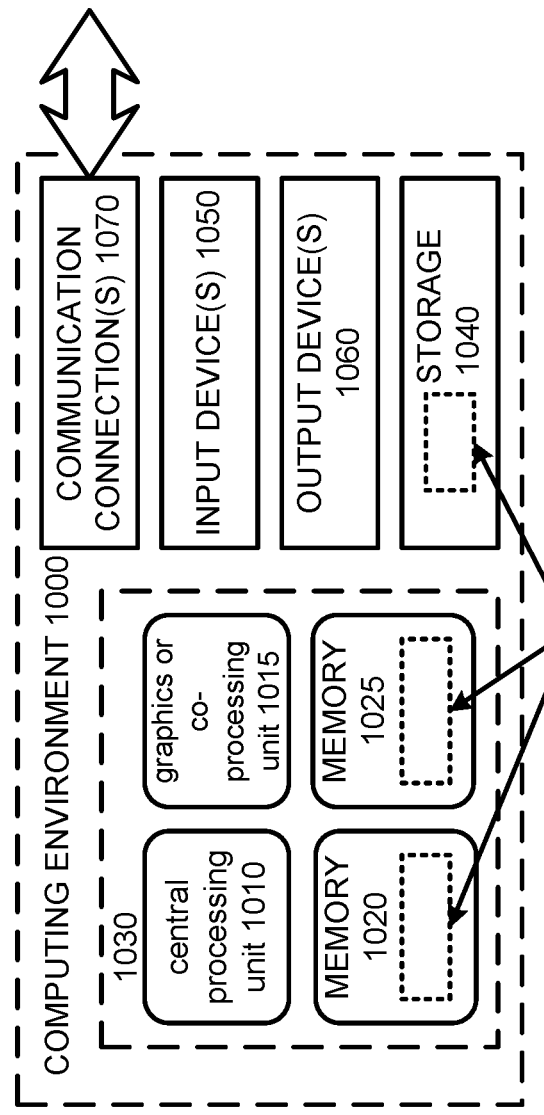
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device (s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A physical transceiver device configured to perform a method, the method comprising:

receiving a first unencrypted Ethernet frame having a first size and comprising an Ethernet type field and a payload;

encrypting the Ethernet type field and the payload of the first unencrypted Ethernet frame;

generating a padding field sized to obfuscate the first size of the first unencrypted Ethernet frame, the size of the padding field based on a period of time between when an end of the first unencrypted Ethernet frame is detected and when a beginning of a next unencrypted Ethernet frame following the first unencrypted Ethernet frame is detected, wherein the padding field includes at least two or more chained headers in a sequence with a previous header in the sequence identifying whether there is a next header in the sequence until a last header in the sequence, which indicates that there is no further headers;

generating a first encrypted Ethernet frame comprising the encrypted Ethernet type field, the encrypted payload, the generated padding field, and a first integrity check value selected to authenticate the first encrypted Ethernet frame, wherein the generating of the first encrypted Ethernet frame includes inserting the padding field after the first integrity check value, but before a second integrity check value; and transmitting the first encrypted Ethernet frame.

2. The physical transceiver device of claim 1, wherein the padding field comprises a first field chained to a second field, and the second field indicates an end of the padding field.

3. The physical transceiver device of claim 1, wherein the padding field comprises a number of subfields and the number of subfields is based on the period of time between when the end of the first unencrypted Ethernet frame is detected and when the beginning of the next unencrypted Ethernet frame is detected.

4. The physical transceiver device of claim 1, wherein the first encrypted Ethernet frame comprises an embedded integrity check value different from the first integrity check value, the embedded integrity check value selected to authenticate the encrypted Ethernet type field and the encrypted payload, but not the padding field.

5. The physical transceiver device of claim 1, wherein the physical transceiver device is further configured to:
   detect an inter-frame gap between received Ethernet frames;
   generate a filler Ethernet frame comprising a padding field and an Ethernet type field indicating the filler Ethernet frame is a filler Ethernet frame;
   encrypt the filler Ethernet frame to generate an encrypted filler Ethernet frame; and transmit the encrypted filler Ethernet frame.

6. The physical transceiver device of claim 1, wherein the physical transceiver device is further configured to:
   receive a second encrypted Ethernet frame comprising the second integrity check value, a second encrypted Ethernet type field, a second encrypted payload, and a second padding field;
   using the second integrity check value, authenticate the second encrypted Ethernet type field and the second encrypted payload of the second encrypted Ethernet frame;
   decrypt the second encrypted Ethernet type field to generate a second unencrypted Ethernet type field;
   decrypt the second encrypted payload to generate a second unencrypted payload;
   generate a second unencrypted Ethernet frame comprising the second unencrypted Ethernet type field and the second unencrypted payload without the padding field; and
   transmit the second unencrypted Ethernet frame.

7. A method comprising:
   receiving a first unencrypted link layer packet comprising a first payload of a first size; encrypting the first payload of the first unencrypted link layer packet;
   generating a variable length padding field that is sized based on a period of time between when an end of the first unencrypted link layer frame is detected and when a beginning of a next unencrypted link layer frame following the first unencrypted link layer frame is detected wherein the variable length padding field includes a plurality of chained headers coupled in series, wherein each chained header includes an indicator of whether there is a next chained header in the series;
   generating an encrypted link layer packet comprising a second payload including the encrypted payload and the variable length padding field so that the second payload of the encrypted link layer packet is a different size than the first size, wherein the second payload of the encrypted link layer packet comprises a first integrity check value and the variable length padding field is inserted after the first integrity check value but before a second integrity check value; and
   transmitting the encrypted link layer packet.

8. The method of claim 7, wherein the variable length padding field comprises a variable number of subfields of uniform length and the number of subfields for a particular encrypted link layer packet is encoded within one or more of the subfields of the particular encrypted link layer packet.

9. The method of claim 7, wherein the variable length padding field comprises a first subfield chained to a second subfield, and the second subfield indicates an end of the variable length padding field.

10. The method of claim 7 wherein the first integrity check value is selected to authenticate the first payload and not the variable length padding field.

11. The method of claim 7 wherein the first integrity check value is selected to authenticate the first payload and the variable length padding field.

12. The method of claim 7, further comprising:
   detecting an inter-packet gap between received link layer packets;
   generating a filler link layer packet comprising an encrypted type field indicating the filler link layer packet is a filler link layer packet; and
   transmitting the filler link layer packet in response to the detected inter-packet gap.

13. The method of claim 12, wherein a length of the filler link layer packet is based on a length of the inter-packet gap.

14. A method comprising:
   receiving a first link layer packet comprising an encrypted payload and a first integrity check value;
   decrypting the encrypted payload to determine a packet type field, an inner payload, and a padding field, wherein the size of the padding field is based on a length of an inter-packet gap between a first unencrypted link layer packet comprising the unencrypted inner payload, and a subsequent unencrypted link layer packet following the first unencrypted link layer packet and wherein the padding field further comprises a plurality of headers in sequence, with a previous header in the sequence identifying whether there is a next header in the sequence until a last header in the sequence, which indicates that there is no further headers and wherein the padding field is after the first integrity check value but before a second integrity check value;
   generating a second link layer packet comprising the packet type field and the inner payload and excluding the padding field; and
   transmitting the second link layer packet.

15. The method of claim 14, wherein the padding field comprises a variable number of subfields, and the method further comprises:
   decoding a first subfield to determine whether the padding field includes a second subfield.

16. The method of claim 14, wherein the padding field comprises a variable number of subfields, and the method further comprises:
   decoding a subfield to determine the subfield is a last subfield of the padding field.

17. The method of claim 14, wherein the method further comprises:
   using the first integrity check value to authenticate the packet type field and the inner payload of the first link layer packet.

18. The method of claim 14, wherein the method further comprises:
   decrypting the encrypted payload of the first link layer packet to determine the first integrity check value; and
   using the first integrity check value to authenticate the packet type field and the inner payload but not the padding field.

19. The method of claim 14, further comprising:
   receiving a third link layer packet comprising an encrypted payload;

decrypting the encrypted payload and determining that the third link layer packet is a filler link layer packet; and dropping the filler link layer packet without transmitting the filler link layer packet.

* * * * *